May 27, 1941.　　　　E. M. SHANNON　　　　2,243,656
POWER REVERSE GEAR
Filed April 14, 1937　　　5 Sheets-Sheet 1

INVENTOR
ELLWOOD M. SHANNON
BY
ATTORNEY

May 27, 1941.  E. M. SHANNON  2,243,656
POWER REVERSE GEAR
Filed April 14, 1937  5 Sheets-Sheet 2
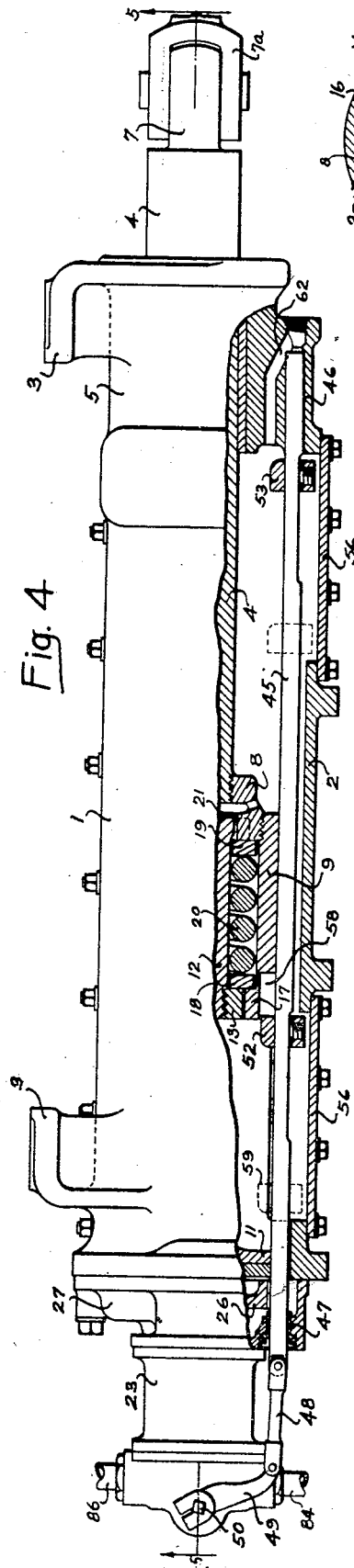
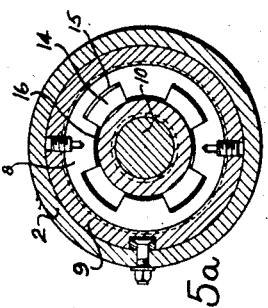
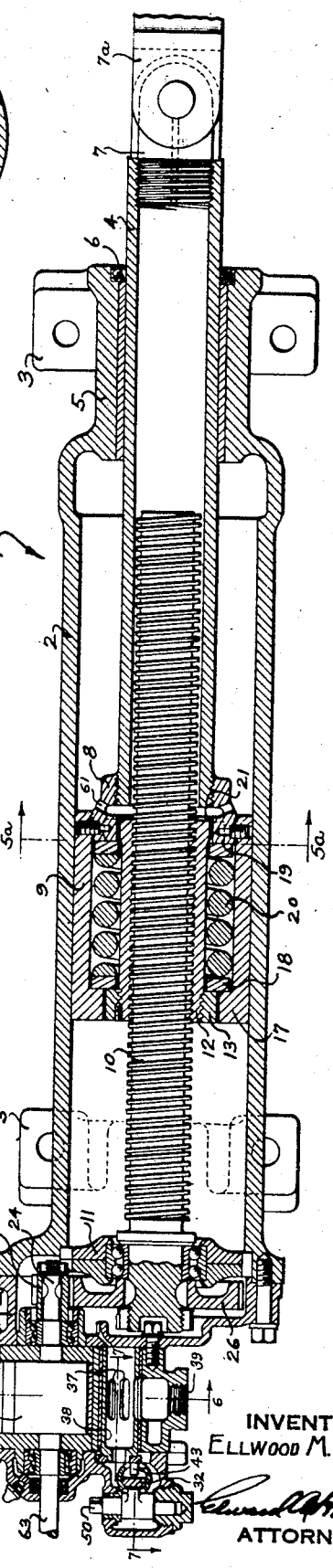
INVENTOR
Ellwood M. Shannon
ATTORNEY

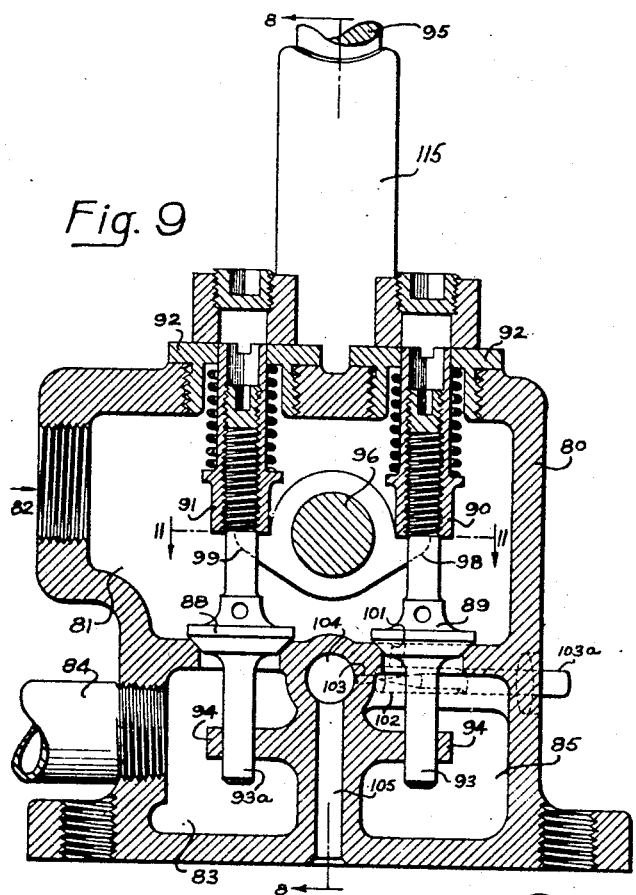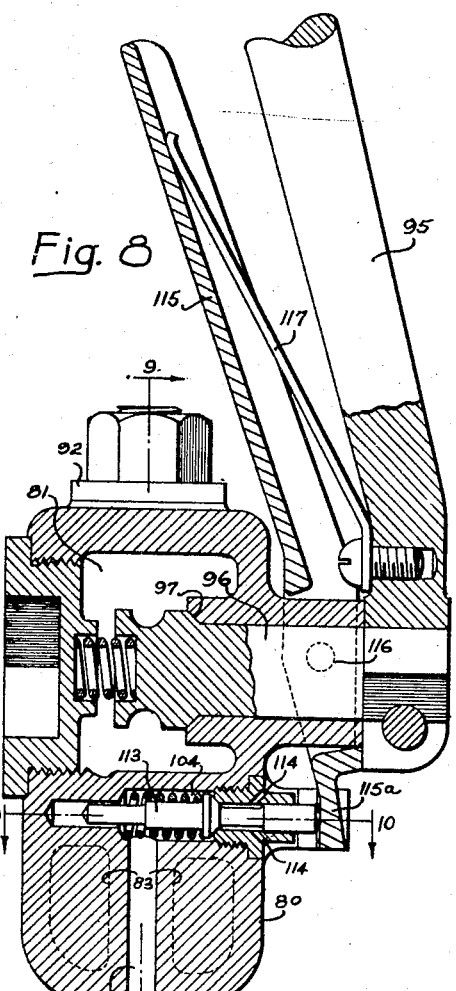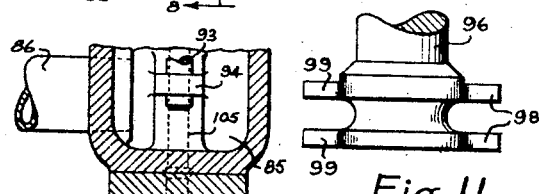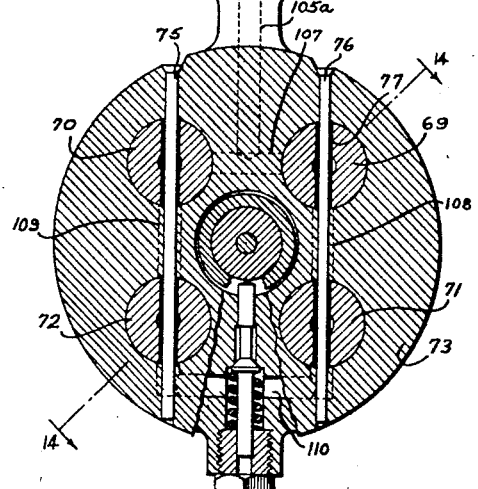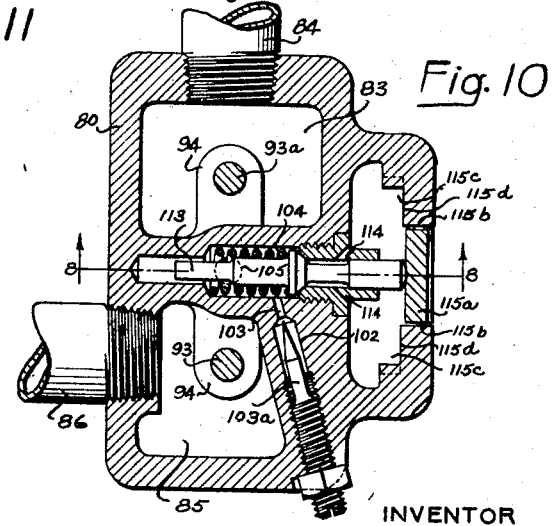

May 27, 1941.  E. M. SHANNON  2,243,656
POWER REVERSE GEAR
Filed April 14, 1937  5 Sheets-Sheet 5
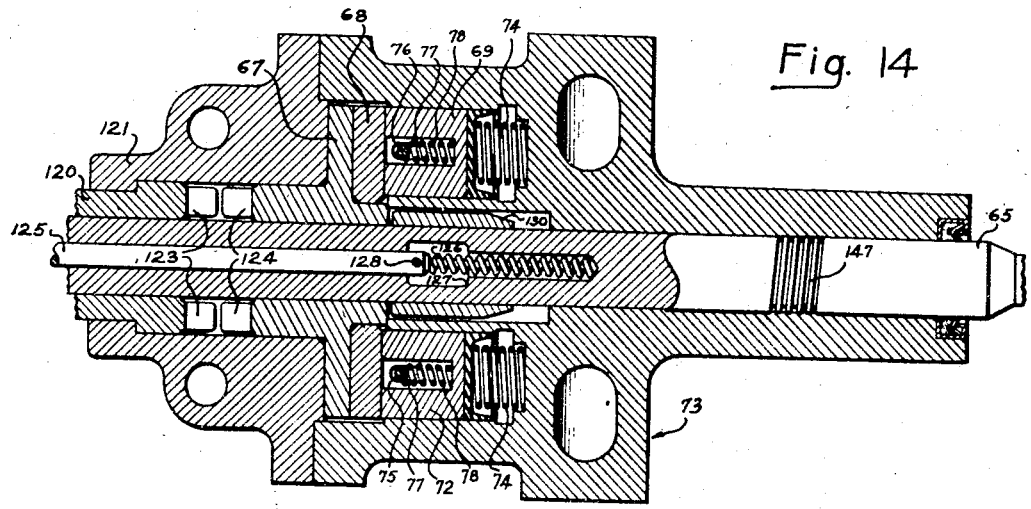
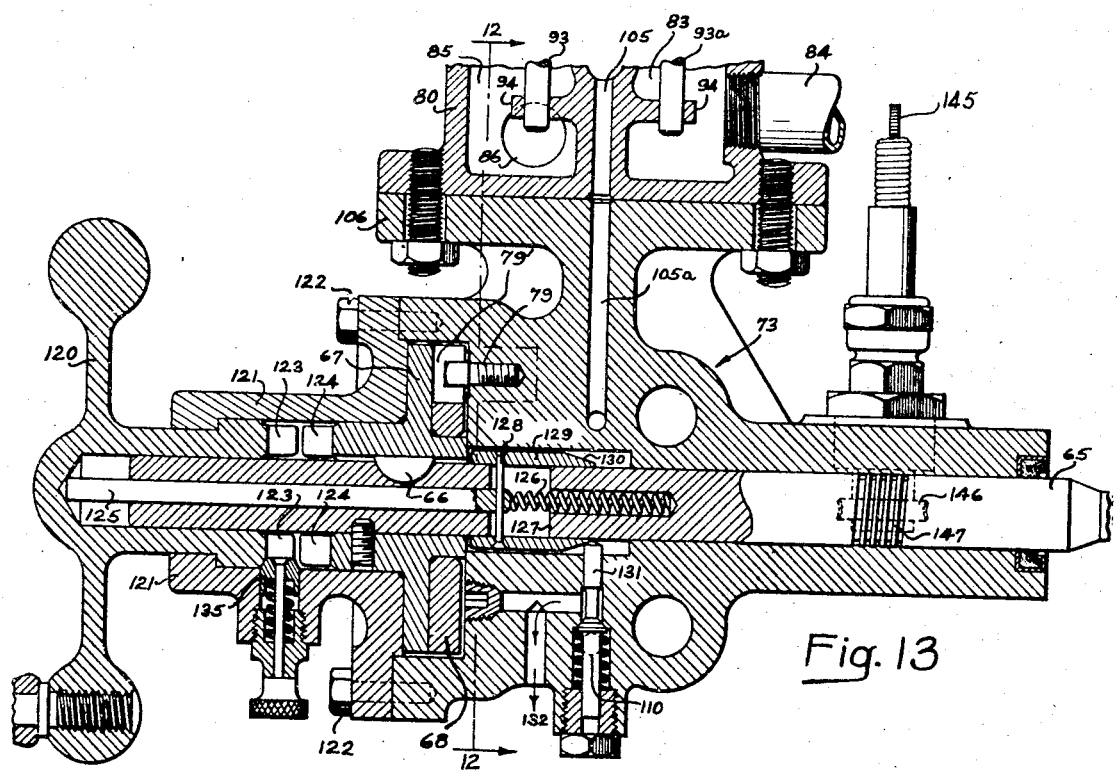
INVENTOR
ELLWOOD M. SHANNON
BY
ATTORNEY Patented May 27, 1941

2,243,656

UNITED STATES PATENT OFFICE 2,243,656

POWER REVERSE GEAR

Ellwood M. Shannon, Bala Cynwyd, Pa.

Application April 14, 1937, Serial No. 136,772

10 Claims. (Cl. 121—40)

This invention relates generally to power reverse gears for locomotives and more particularly to an improved screw type power reverse gear.

Innumerable types and arrangements of power reverse gears have been proposed or used in the past fifty years or so, but notwithstanding this great amount of effort there are noticeable defects in these prior designs from the standpoint of construction, operation or maintenance. As to the operation, the principal problem has to do with prevention of creeping. In some instances, it has been proposed to overcome creeping in fluid actuated types of power reverse gears by mechanically locking the piston rod. This involves complications and uncertainties of control, and to overcome these the screw type power reverse gear has been proposed and used, the screw inherently tending to provide a locking action. However, the screw type power reverse gears have not been entirely satisfactory because of insufficient or complicated cushioning means and also because such gears have structural complications as well as not having sufficient sensitivity and fast operation under certain conditions. Nevertheless the screw type offers certain desirable characteristics.

It is an object of my invention to provide an improved screw type power reverse gear that has the desirable characteristics of this general type of gear but without the objectionable characteristics thereof.

Another object is to provide improved resilient means in a simple, compact and inexpensive manner for cushioning the forces transmitted from the locomotive valve gear to the screw.

A further object is to provide an improved combination in a screw type power reverse gear whereby various operating parts such as the servomotor, screw, crosshead, resilient means and reduction gearing may be effectively encased within a housing containing a substantial amount of oil for lubricating said parts as well as others.

It is also an object of my invention to provide improved control means whereby the screw mechanism and parts connected thereto are brought to a gradual and easy stop at the extreme limits of travel.

A still further object is to provide an improved brake mechanism for the servo-motor and screw together with an improved control apparatus therefor whereby the servo-motor may operate freely when actuating the screw and yet on completion of the operation of the motor is effectively held in position.

Another object is to provide an improved arrangement whereby the cut-off indicator may be located in the cab in a simple and effective manner.

An additional and very desirable object is to accomplish the foregoing objects in a structure that is simple, compact and inexpensive in construction, operation and maintenance and yet is highly rugged and positive without sacrifice of sensitivity or accuracy together with having the various parts readily accessible for inspection or repair.

Other objects and advantages will be more apparent to those skilled in the art from the following description of the accompanying drawings in which:

Fig. 4 is a plan view of the power reverse gear proper with parts broken away to show certain parts in detail;

Fig. 5 is a longitudinal vertical section through the power reverse gear proper taken substantially on the line 5—5 of Figs. 4 and 6;

Fig. 5a is a transverse section taken on the line 5a—5a of Fig. 5;

Fig. 8 is a vertical transverse section taken substantially on the line 8—8 of Figs. 1, 9 and 10, showing the main control handles for both the air operated servo-motor and braking mechanism together with the brake control exhaust valve;

Fig. 9 is a vertical section taken on the line 9—9 of Fig. 8 to show the forward and reverse main control valves;

Fig. 10 is a horizontal section taken on the line 10—10 of Fig. 8;

Fig. 11 is a plan view of the inner end of the main control valve operating shaft by itself taken substantially on the line 11—11 of Fig. 9 but with all other parts omitted in order to show the valve engaging fingers alone;

Fig. 12 is a transverse section taken on the line

12—12 of Fig. 13 to show the brake operating pistons and cylinders in cross-section and is further broken away to show an additional valve for releasing fluid pressure from the brake cylinders when it is desired to make a manually controlled precision adjustment of the cut-off;

Fig. 13 is a vertical longitudinal section through the brake mechanism and the manually operable precision adjusting means;

Fig. 14 is a horizontal section taken on the line 14—14 of Fig. 12 showing two of the brake pistons and cylinders.

The invention, such as is specifically disclosed herein merely for the purpose of illustrating one specific form among possible others that the invention might take in practice, comprises essentially four coordinated mechanisms, namely, the power reverse gear proper including the screw and servo-motor with the various improved features thereof, the main control valve mechanism normally located in the cab and adapted to effect forward or reverse operation of the servo-motor, the braking mechanism and its control for positively holding the servo-motor and screw in any desired fixed position, and the precision adjusting mechanism.

Figure 1:
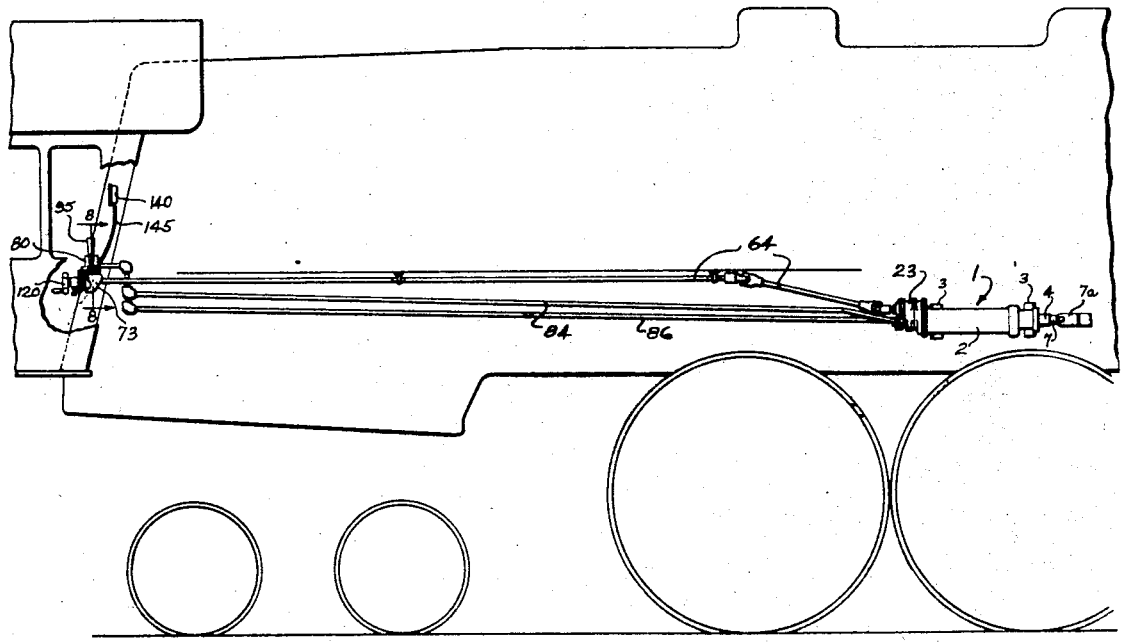
Fig. 1 is a fragmentary diagrammatic side elevation of a locomotive showing the general application of my improved power reverse gear and control, the usual valve gear being omitted for sake of clarity.

*Power reverse gear proper.*—This, as generally indicated at 1, Fig. 1, is mounted in any suitable manner on the locomotive to adjust any usual and well-known valve gear not shown. The reverse gear includes (Figs. 4 and 5) a stationary crosshead guide housing 2 in the form of a cylinder having side brackets 3 for attachment to the locomotive. A hollow rod 4 extending through a packing 6 in a reduced neck portion 5 of the housing has a usual head 7 adapted for pivotal connection to a reach rod 7a for transmitting longitudinal adjusting movement to the usual valve gear. A collar 8 is threadedly secured to the inner end of rod 4 and a cylindrical piston-like crosshead 9 slidably supported in cylinder 2 is threadedly connected to collar 8. The integral piston-like crosshead 9 and rod 4 are hereinafter referred to as a piston and piston rod. A screw 10, journalled in a partition 11 at one end of housing 2, extends within hollow rod 4 and carries a cooperating threaded nut 12. This nut has a threaded, or otherwise suitably formed, flange 13 at one end and the other end has, Fig. 5a, a series of alternate radial recesses and lugs 14. These lugs are axially slidably received in suitable radial recesses 15 formed in collar 8, lugs 16 being formed alternately with said recesses. Disposed in radial alignment with, and axially slidable within, flange 13 is a flange 17 projecting inwardly from piston 9. These two sets of flanges and lugs, constitute radially aligned laterally extending surfaces. Washers 18 and 19 are normally held in seating engagement respectively with flanges 13 and 17 and lugs 14 and 16 by a single interposed coil spring 20. Appreciable relative axial movement can occur between nut 12 and piston 9 by reason of recesses 15 extending from the left side of collar 8 inwardly to an annular groove 21 therein although the extent of such relative movement is limited by the spacing between the successive coils of the spring.

Figure 6:
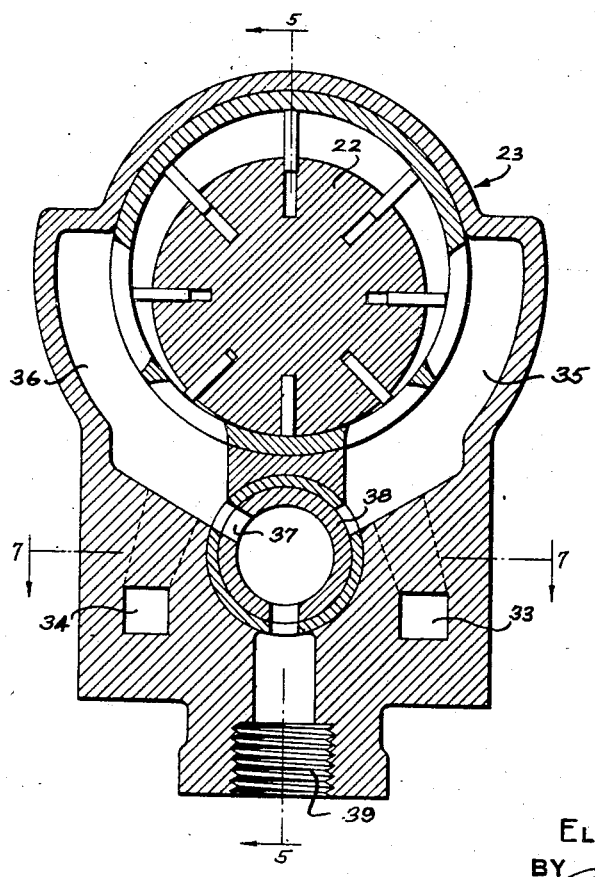
Fig. 6 is a transverse section through the servo-motor taken substantially on the line 6—6 of Fig. 5.

The motive power and gear connections for actuating the screw 10 may comprise any suitable or standard form of fluid operated servo-motor and gears, which however are herein provided with improved end plates and heads having a novel structural and functional cooperation with the remaining elements. The motor specifically disclosed herein and as shown particularly in Fig. 6 is of the radial blade-piston type having a rotor 22 journalled eccentrically in a motor housing 23. The rotor has a shaft 24, Fig. 5, connected through a pinion 25 and gear 26 to rotate screw 10. The housing 23 is connected to cylinder 2 by a bolted offset gear housing 27 forming an end closure for the cylinder. Otherwise the specific detailed construction of the motor per se does not constitute a part of my present invention except in the manner in which its operation is coordinated with movement of piston 9 at the extremes of its travel.

Figure 7:
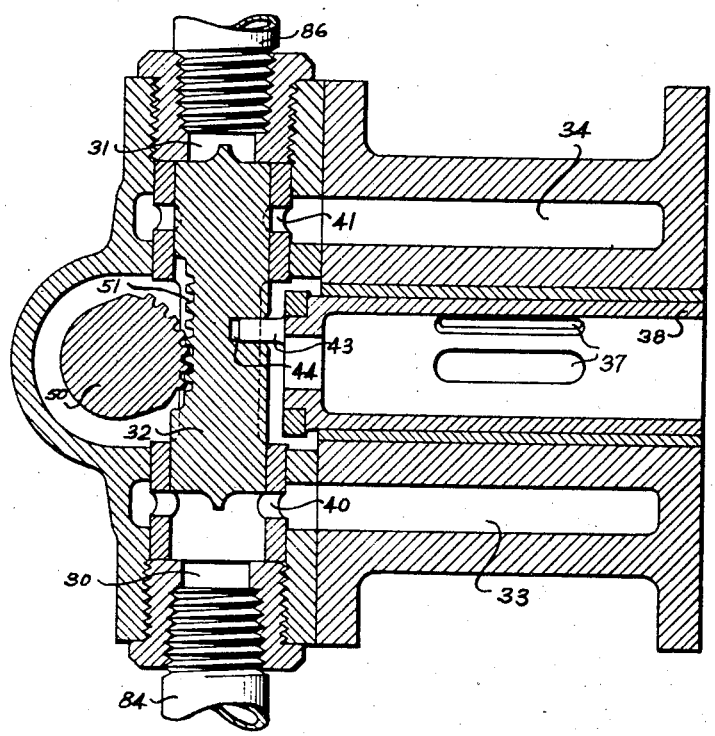
Fig. 7 is a horizontal section taken substantially on the lines 7—7 of Figs. 5 and 6 to show the distributing valves of the servo-motor.

The distributing valve mechanism for the servo-motor includes as shown in Fig. 7 two opposed pressure fluid inlets 30 and 31 adapted to be alternatively connected respectively by a suitable shuttle valve 32 to inlet passages 33 and 34. As shown in Fig. 6, the passages 33 and 34 connect into side chambers 35 and 36, and these chambers in turn are adapted to be alternatively connected through a port 37 of a rotatable sleeve valve 38 to an exhaust port 39. It will be noted, Fig. 7, that shuttle valve 32 is of sufficient axial length that it may simultaneously cover two sets of ports 40 and 41 which connect the inlets 30 and 31 with their respective passages 33 and 34, thereby to entirely shut off supply of pressure air to the motor, or the ports 40 and 41 may be alternatively opened. The transverse movement of shuttle valve 32 is coordinated with the oscillatable movement of sleeve valve 38 by a cylindrical pin 43 projecting eccentrically therefrom into a recess 44 in the side of valve 32 whereby axial movement of valve 32 will impart rotation to valve 38. In one position of valves 32 and 38 such as shown in Figs. 6 and 7, the servo-motor will rotate in one direction and in the other extreme position of said valves opposite rotation will result, while an intermediate position of said valves will cause said motor to stop.

To coordinate movement of piston 9 with the distributing valve mechanism just described, a limit rod 45, Fig. 4, is slidably supported at 46 and 47 by the cylinder heads. This rod is pivotally connected through a link 48 and arm 49 to a vertical segmental pinion shaft 50, Figs. 4 and 7, this pinion meshing with a rack 51 formed on the side of shuttle valve 32. Rod 45 also carries a pair of limit or stop lugs 52 and 53 suitably adjustably secured to the rod, convenient access to these limit lugs being had by removal of either one or both of a pair of cover plates 56. The piston 9 is adapted to engage these lugs in approaching either of the extreme limits of travel, thereby to operate pinion shaft 50 and rack 51 to return shuttle valve 32 to its neutral position. In this manner, the motor cannot jam the piston 9 and nut 12 at either end of its extreme positions. To render this limit stop apparatus compact, a recess 58 is formed in the left end of piston 9, Fig. 4, to receive stop 52 which is hereby adapted to be moved to its maximum rearmost position as shown in dotted lines at 59 while permitting piston 9 to extend still further to the left. The housing 1 and the various parts as constructed are conducive to maintaining a high level of lubricant within the housing, this lubricant then circulating, Fig. 5, through ports 61 to the screw while as shown in Fig. 4 the right end of shaft 45 has free communication through a passage 62 within the cylinder housing.

*Braking mechanism.*—To prevent rotation of the screw through vibration, the outwardly extending rotor shaft 63 is flexibly connected through jointed shafts 64 to a shaft 65, Fig. 13, of a brake mechanism located in the cab. A brake disc 67, keyed at 66 to shaft 65, has an annular recess in which an annular brake shoe 68 is disposed. This brake shoe is brought into frictional engagement with brake disc 67 by a plurality of brake pistons 69, 70, 71 and 72, Figs. 12 and 14, disposed in cylindrical bores of a brake housing 73. Cup washer packings are held against the pistons, Fig. 14, by springs 74. The pistons are held in position during assembling of the brake by a pair of vertical pins 75 and 76, Figs. 12 and 14, extending downwardly through casing 73 and elongated slots such as 77 formed in the ends of the pistons. Small compression springs 78, Fig. 14, are interposed between rods 75 and 76 and the piston to move the pistons away from the brake disc 68 when air pressure is exhausted. The springs 78 are of sufficient strength to overcome springs 74 so as to move pistons 69 and 72 to the right when air pressure is released from behind the pistons. A series of pins 79, Fig. 13, are secured in casing 73 and project into suitable radial slots 79' of brake shoe 68 thereby to prevent it from rotating with brake disc 67 upon engagement therewith.

*Main control valve mechanism.*—To control supply of operating fluid to servo-motor 23 and to control the engagement or disengagement of the brake elements 67 and 68, a valve housing 80, Figs. 8, 9 and 10, has a main chamber 81 to which pressure fluid from any suitable source is supplied through an inlet 82. An outlet chamber 83 communicates through a pipe 84 with shuttle valve inlet 30, Fig. 7, while an outlet chamber 85, Fig. 10, communicates through a pipe 86 with the other shuttle valve inlet 31. Communication between chambers 81, 83 and 85 is controlled by a pair of main control valves 88 and 89 normally urged downwardly by suitably adjustable spring pressed slidable collars 90 and 91, the valves being bodily removable through enlarged openings closed by threaded plugs 92. The valves have downwardly projecting stems 93 and 93a suitably guided in arms 94. The valves are alternately raised by rotation of a handle 95 secured to a shaft 96, Fig. 8, which has a bevelled sealing contact 97 with a suitable projection on casing 80. Formed integrally with or otherwise suitably secured to said shaft are two pairs of oppositely extending fingers 98 and 99, Fig. 11, adapted respectively to engage the under side of collars 90 and 91. Both valves, however, are adapted to be in closed position when handle 95 is in its neutral position. By raising say valve 88, fluid pressure is supplied from chamber 81 to pipe 84, Figs. 9 and 7, thereby shifting shuttle valve 32 to open port 40 and simultaneously cause sleeve valve 38 to rotate. Pressure fluid is thus admitted to cause rotation of the servo-motor and screw 10 in one direction. When valve 89 is opened and valve 88 closed, fluid pressure is admitted to pipe 86 to shift shuttle valve 32 so as to open port 41 and rotate sleeve valve 38 in the opposite direction, thereby to operate the servo-motor and screw 10 in the opposite direction. When both valves 88 and 89 are closed, the servo-motor is prevented from rotating by virtue of brake shoe 68 being pressed against brake disc 67, Figs. 13 and 14, now about to be described.

*Brake control valve mechanism.*—To control the operation of the brake shoe 68 by pistons 69—72 in cooperation with the operation of main control valves 88 and 89, I continuously supply operating fluid from main supply chamber 81, Fig. 9, downwardly through a port 101 into a horizontal passage 102, Figs. 9 and 10, thence through an adjustable needle controlled orifice 103 to an exhaust valve chamber 104 from which a passage 105 extending vertically downward for communication with a continuing passage 105a, Figs. 12, 13 and 14 in the brake housing 73. The control valve housing 80 is suitably secured to a supporting flange 106 of housing 73. Passage 105a first supplies fluid pressure to pistons 69 and 70 through a passage 107 and thence by vertical passages 108 and 109 to the lower pistons which in turn are connected by a cross-passage 110.

To exhaust air from the brake cylinders and thereby release the brake to permit rapid unrestricted rotation of the servo-motor 23, I provide, Fig. 8, an exhaust valve 113 normally yieldingly held to its seat but adapted when opened to discharge fluid from chamber 104 through atmospheric ports 114, Fig. 8. This valve is operated by a finger lever 115 pivotally mounted at 116 on a suitable projection of handle 95 whereby handles 95 and 115 may be simultaneously gripped with one hand to move the latter against the action of a spring 117 to open valve 113. When valve 113 is open, the passages 114 are of such proportion as to permit free discharge of the air which is continuously supplied to chamber 104 through the adjustable orifice 103. Hence the action of the brake springs 78 and 74, Fig. 14, is such that upon release of the operating fluid pressure, the brake pistons release the frictional braking action on disc 67, whereupon movement of handle 95 to either its forward or reverse position will immediately operate control valves 88 and 89, Fig. 9, to cause rotation of the servo-motor. Conversely when the handle 115 is released, exhaust valve 113, Fig. 8, is closed thereby causing pressure to build up behind the brake pistons to apply braking action to the servo-motor through disc 67, shaft 65 and the jointed connecting shafts 64. When the handle 115 is in neutral, the valve operating end 115a, Figs. 8 and 10, is positioned in a recess 115b, thereby preventing operation of the servo-motor without first releasing the brake. To release the brake, lever 115a is moved into a laterally enlarged recess 115c and upon handle 95 thereafter being rotated away from its neutral position to operate the servo-motor, then lever 115a will be laterally moved and accordingly be held in its releasing position by one or the other of walls 115d. Hence the supply of operating fluid to the servo-motor must be shut off before the brake can be applied.

*Precision adjusting mechanism.*—To effect precision adjustment of the power reverse screw 10, I have provided improved means for releasing the braking action and thereafter effecting manual rotation of the screw. This precision mechanism as shown in Fig. 13 comprises a hand wheel 120 journalled on the outer end of shaft 65 and held in position by a suitable cover 121 which is removably secured to casing 73 by bolts 122. The hub of this hand wheel has straight faced clutch teeth 123 adapted when moved inwardly to engage complementary clutch teeth 124 formed on the hub of brake disc 67. An axially shiftable pin 125 extends through shaft 65 for abutting engagement with handle 120 while its other end engages a compression spring 126. Shaft 65 is provided with a slot 127 through which a pin 128 extends, this pin passing through both a cam sleeve 129 and the pin 125. A cam surface 130 is adapted to engage a stem of a supplementary brake control exhaust valve 131 which is normally yieldingly urged to its closed position by a spring and also by fluid pressure in cross-passage 110, Figs. 12 and 13. The valve 131 when opened allows cross-passage 110 and the other intercommunicating air supply passages 108 and 109, Fig. 12, to be connected to exhaust passages 132, Fig. 13.

A finger latch 135, Fig. 13, normally engages clutch teeth 123 to prevent inward movement of hand wheel 120, but upon pulling out of latch 135 hand wheel 120 may be pushed inwardly which not only engages teeth 123 and 124 but also pushes pin 125 inwardly together with cam sleeve 129, thereby forcing valve 131 downwardly to exhaust the fluid pressure acting on the brake pistons. Thereupon rotation of hand wheel 120 will cause rotation of brake disc 67 and shaft 65 through key 66, thereby to rotate the jointed shaft 64 and servo-motor rotor 22 and thence screw 10 to effect a final precision adjustment of the cut-off.

Figure 2:
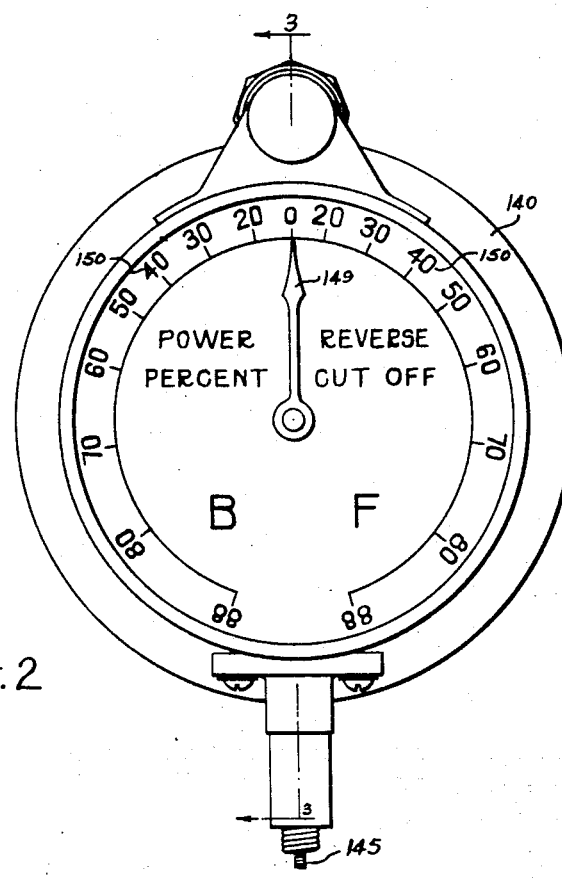
Fig. 2 is a front elevation of the cut-off indicator.
Figure 3:
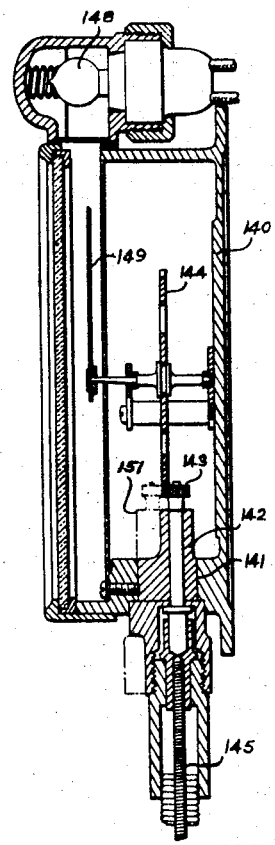
Fig. 3 is a transverse section taken on the line 3—3 of Fig. 2.

To determine the position of the servo-motor, I have provided as shown in Figs. 2, 3 and 13 an improved dial and operating means comprising a casing 140 having a cylindrical opening 141 in which a bushing 142 is disposed, this bushing having a pinion and shaft 143 eccentrically disposed therein for engagement with a pointer driving gear 144. Pinion shaft 143 is connected by a flexible shaft 145 to worm gear 146, Fig. 13. This gear meshes with suitable threads 147 formed on the periphery of shaft 65. A suitable lamp 148 is supported by casing 140 to suitably illuminate the indicating hand 149. Suitable graduations 150 indicate the per cent of cut-off in either forward or reverse direction as well as the neutral position. In case the power reverse gear is of such a type that the reverse and forward positions are contrariwise to those disclosed in the specific embodiment, it is only necessary to move eccentric shaft housing 142, Fig. 3, downwardly to disengage gear 144 and then rotate support 142 through 180° so that the box can then engage the other side of gear 144 as shown in dotted lines at 151.

Operation

To move the power reverse piston 4 in one direction, brake release handle 115, Fig. 8, is manually squeezed against main control handle 95, thereby opening valve 113, Fig. 8, so as to connect ports 105 and 105a, Figs. 8, 12 and 13, to atmospheric exhaust ports 114. Brake pistons 69—72, Figs. 12 and 14, thereby relieve their holding force on the brake shoe 68 which normally acts against the brake disc 67. The operator now swings handle 95 so that shaft 96 and, say fingers 99, Fig. 9, engage collar 61 to raise valve 88 whereupon fluid pressure supplied from a suitable source through inlet 82 and chamber 81 is conducted through pipe 84 to inlet 30, Fig. 7, thereby shifting shuttle valve 32 to admit fluid pressure through port 40 and passage 33 to rotate radial vane type rotor 22. This rotation is transmitted, Fig. 5, through gears 25 and 26 to rotate screw 10 and accordingly axially move nut 12. The nut transmits its motion successively through flange 13, washer 18, spring 20, washer 19 and lugs 16 to piston rod 4. Or, if the nut is moved in the opposite direction upon reverse rotation of the screw, then its motion is transmitted successively through lugs 14, washer 19, spring 20 and flange 17 to the piston rod 4. It is also seen that any vibrational forces transmitted from the locomotive valve gear to piston rod 4 will be cushioned by the action of the spring, washers, flanges or lugs just described. Rotation of motor shaft 63, Fig. 5, transmits its motion through a jointed shaft 64, Fig. 1, to the braking shaft 65, Fig. 13, and thence through gears 146 and 147 to flexible cable 145, Fig. 3. This cable actuates pointer 149 and when it reaches any predetermined cut-off, the engineman then returns handle 95, Figs. 8 and 9, to its neutral position to close valve 88. The servo-motor rotor 22, Fig. 6, thereupon stops. Simultaneously with the return of handle 95 to its neutral position the lower end 115a of brake control handle 115 moves out into the recess 115b to permit closure of exhaust valve 113, Fig. 8. Thereupon fluid pressure is conducted from chamber 81, Fig. 9, through port 101 to passage 102, Fig. 10, and thence through the orifice 103, controlled by adjustable needle valve 103a, to chamber 104 and passages 105 and 105a to move the brake pistons 69—72 and brake shoe 68 against brake disc 67 which is keyed at 66 to shaft 65. This shaft by virtue of the jointed shafts 64 and rotor shaft 63 positively stops rotation of the rotor and screw and also prevents gradual shifting of nut 12 along the screw by reason of vibration transmitted thereto.

To effect operation of the power reverse gear in the opposite direction, handle 95 is swung so as to cause fingers 98 to open valve 89, whereupon fluid pressure is conducted from the main supply chamber 81 to chamber 85 and thence through pipe 86, Fig. 10, to inlet 31, Fig. 7, to shift shuttle valve 32 to uncover port 41 and close port 40, the fluid pressure then being supplied through passage 34 and 36, Fig. 6, to rotate servo-motor rotor 22 in the opposite direction. Simultaneously sleeve valve 38 is rotated by shuttle valve 32 through the pin and slot connection 43, 44, Fig. 7, so as to connect exhaust port 37, Fig. 6, with passage 35.

To effect precision adjustment of the power reverse gear, the engineman after releasing a catch 135 merely moves hand wheel 120 axially inwardly, Fig. 13, which through pins 125 and 128 causes cam 130 to open supplementary brake control exhaust valve 131, thereby exhausting pressure fluid from the brake piston cylinders as through cross-passage 110, Figs. 12 and 13, past valve 131 to atmospheric passages 132. Simultaneously with axial movement of cam 130, clutch teeth 123 and 124 are brought into engagement whereby manual rotation of hand wheel 120 will then rotate shaft 65 through key 66 and accordingly rotate the jointed shaft 64, rotor shaft 63 and the servo-motor gearing together with screw 10. This will effect manual movement of nut 12 and piston rod 4 so long as hand wheel 120 is rotated. When the desired degree of precision adjustment has been effected, the engineman merely pulls out hand wheel 120, Fig. 13, to permit closure of valve 131 whereupon the constant supply of brake actuating pressure through port 101, Fig. 9, will apply a braking action to shaft 65.

To insure maximum safety in the movement of piston rod 4 at the extreme limits of its travels, piston 9 is adapted to engage stop lug 52 during movement in the left direction, Fig. 4, thereby shifting rod 45, link 48 and arm 49 to cause pinion shaft 50 and rack 51, Fig. 7, to move shuttle valve 32 to its neutral position in which ports 40 and 41 are both covered. This cuts off supply of fluid to servo-motor 23 and accordingly stops movement of piston rod 4, the braking mechanism not being applied unless the engineman returns handle 95 to neutral. In the opposite direction of movement of piston 9, Fig. 4 it will engage a stop lug 53 to shift rod 45 to the right, thereby reversely actuating shuttle valve 32 so as to cover both ports 40 and 41 to stop the servo-motor.

From the foregoing disclosure it is seen that I have provided a highly effective power reverse gear that is positive in operation and yet has maximum flexibility and responsiveness with minimum effort on the part of the engineman. This is accomplished with minimum possibility of creeping and yet vibrational forces from the valve gear are adequately cushioned in a relatively simple, compact and efficient device employing only a single spring that functions for vibratory movement in either direction. The precision adjustment of the cut-off position may be obtained without undue restraint by the major control parts, this precision adjustment being accomplished in a simple and yet highly coordinated manner with the major control elements. It is also seen that provision is made for continuous lubrication in a common casing for the screw, nut, reduction gears 25 and 26 and servo-motor rotor parts and valves with minimum possibility of the lubricant draining therefrom.

It will of course be understood that various changes in details of construction and arrangement of parts may be made by those skilled in the art without departing from the spirit of the invention as set forth in the appended claims.

I claim:

1. A power reverse gear comprising, in combination, a rod, a screw, means including a nut operatively connecting said screw and rod, a rotatable servo-motor for operating said screw, means for commonly supporting the rod, the screw and the servo-motor, a plurality of cooperating valves for controlling and distributing operating fluid to said servo-motor, including a shuttle valve selectively disposable in forward, neutral or reverse position, and means including a shiftable link and a rotatable element actuated thereby so as to move said shuttle valve to its neutral position and thereby shut down said motor automatically when said rod has moved to a predetermined position in its travel.

2. A power reverse gear comprising, in combination, a rod, a screw, means including a nut operatively connecting said screw and rod, a rotatable servo-motor for operating said screw, means for commonly supporting the rod, the screw and the servo-motor, a plurality of cooperating valves for controlling and distributing operating fluid to said servo-motor, and means for operating one of said valves so as to shut down said motor automatically when said rod has moved to a predetermined position in its travel, said valve which is automatically controlled by movement of said rod comprising a shuttle valve to which fluid pressure is alternatively supplied at two inlets with connecting ports between said inlets and said motor, said valve and ports being arranged so that in the extreme positions of the shuttle valve, one or the other of said ports is open and in the neutral position both of said ports are closed, whereby admission of fluid pressure to one of said inlets causes one of said ports to be opened and admission of fluid pressure to the other inlet causes the other port to be opened, and means operatively connected to said rod for moving said shuttle valve to its neutral position automatically in accordance with a predetermined movement of said rod.

3. A power reverse gear comprising, in combination, a screw and nut, a rotatable servo-motor for effecting relative rotation between said screw and nut, a housing located alongside of the locomotive boiler for commonly supporting the nut, the screw and servo-motor, a control valve mechanism located in the locomotive cab at a point remote from said servo-motor for controlling supply of operating fluid thereto, relatively rotatable braking elements located in the cab, a rotatable shaft connected to said servo-motor and extending therefrom to said cab for connection to the rotatable braking element, and means located in said cab for releasably controlling the braking mechanism therein.

4. The combination set forth in claim 3 further characterized in that said releasable braking means includes a pair of frictionally cooperating relatively rotatable braking elements one of which is radially supported by the other.

5. A power reverse gear comprising, in combination, a rod, a screw, means including a nut for operatively connecting said rod and screw, a rotatable servo-motor for effecting relative rotation between said screw and nut, releasable fluid pressure biased frictional braking means operative to restrain rotation between said screw and nut, manually operable supplemental means for effecting said relative rotation between said nut and screw, and means manually actuated by said supplemental means for releasing the fluid pressure of said frictional braking means to allow said supplemental operating means to be actuated.

6. A power reverse gear comprising, in combination, a rod, a screw, means including a nut for operatively connecting said rod and screw, a rotatable servo-motor for effecting relative rotation between said screw and nut, releasable braking means operative to restrain rotation between said screw and nut, supplemental means for effecting said relative rotation between said nut and screw, and means controlled by said supplemental operating means thereby to release said braking means automatically upon initial actuation of said supplemental means.

7. The combination set forth in claim 6 further characterized by the provision of means whereby said braking means is applied automatically upon discontinuance of the actuation of said supplemental operating means.

8. The combination set forth in claim 6 further characterized in that said releasable braking means includes a pair of frictionally cooperating relatively rotatable braking elements one of which is radially supported by the other, said means which is controlled by said supplemental means including a valve operating rod extending coaxially through said braking elements and one end of said rod having engagement with said supplemental means and the other end of said rod having valve actuating means adapted to release said braking means upon axial movement of said rod.

9. The combination set forth in claim 6 further characterized by the provision of a rotatable shaft connected to and extending from said servo-motor to said braking means, said braking means having a pair of cooperating friction elements one of which is operatively connected to said shaft for rotation therewith and the other of which is held against rotation, the rotatable one of said friction elements and said supplemental means having mechanical clutch elements adapted to be releasably engaged upon axial movement of said supplemental means, and said means for releasing the braking means includes a rod movable axially through said friction elements and engageable at one end with said supplemental means and having connection at its other end with a tapered sleeve encircling said shaft, and a valve laterally operable by said tapered sleeve for controlling the release of said braking means.

10. A power reverse gear comprising, in combination, a rod, a screw, means including a nut for operatively connecting said screw and rod, a rotatable servo-motor for effecting relative rotation between said screw and nut thereby to move said rod; fluid pressure biased braking means having a rotatable friction element operative to restrain said relative rotation between the screw and nut, and means for releasably controlling the application of fluid pressure to said braking means, said braking means including a plurality of fluid pressure operated pistons for applying the braking force and said means for releasably controlling the fluid to said brake means being operative to release simultaneously the fluid pressure on each of said pistons.

ELLWOOD M. SHANNON.